(12) United States Patent
Hartmann

(10) Patent No.: US 11,623,271 B2
(45) Date of Patent: Apr. 11, 2023

(54) AMORPHOUS METAL FOIL AND METHOD FOR PRODUCING AN AMORPHOUS METAL FOIL USING A RAPID SOLIDIFICATION TECHNOLOGY

(71) Applicant: Vacuumschmelze GmbH & Co. KG, Hanau (DE)

(72) Inventor: Thomas Hartmann, Buedingen (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 309 days.

(21) Appl. No.: 16/998,319

(22) Filed: Aug. 20, 2020

(65) Prior Publication Data
US 2021/0053110 A1 Feb. 25, 2021

(30) Foreign Application Priority Data

Aug. 21, 2019 (DE) ..................... 10 2019 122 524.8

(51) Int. Cl.
*B22D 11/06* (2006.01)
*B22D 11/00* (2006.01)
*C22C 45/02* (2006.01)

(52) U.S. Cl.
CPC ........ *B22D 11/0651* (2013.01); *B22D 11/001* (2013.01); *B22D 11/0611* (2013.01); *C22C 45/02* (2013.01); *C22C 2200/02* (2013.01)

(58) Field of Classification Search
CPC .............. B22D 11/0651; B22D 11/001; B22D 11/0611; B22D 11/0665; B22D 11/0668; B22D 11/0674; B22D 11/0694; B22D 31/00; B22D 31/002
See application file for complete search history.

(56) References Cited

U.S. PATENT DOCUMENTS

| | | | |
|---|---|---|---|
| 4,708,194 A * | 11/1987 | Mohn | B23K 20/1215 164/463 |
| 4,793,400 A | 12/1988 | Wood | |
| 4,979,577 A | 12/1990 | Walter | |
| 6,749,700 B2 | 6/2004 | Sunakawa et al. | |
| 9,053,847 B2 | 6/2015 | Zhou et al. | |
| 9,700,937 B2 | 7/2017 | Schulz | |
| 2003/0041931 A1 | 3/2003 | Sunakawa et al. | |
| 2012/0262266 A1 | 10/2012 | Herzer et al. | |
| 2016/0319409 A1 | 11/2016 | Theisen et al. | |
| 2018/0221941 A1 | 8/2018 | Okabe et al. | |

FOREIGN PATENT DOCUMENTS

| | | |
|---|---|---|
| CN | 102513527 A | 6/2012 |
| CN | 104376950 A | 2/2015 |
| CN | 106086714 A | 11/2016 |

(Continued)

OTHER PUBLICATIONS

Vitroperm 270 Brochure; Vacuumschmelze GmbH & Co. KG, Hanau, Version: Jun. 2019.

*Primary Examiner* — Kevin P Kerns
*Assistant Examiner* — Steven S Ha
(74) *Attorney, Agent, or Firm* — Dickinson Wright PLLC

(57) ABSTRACT

Amorphous metal foil and method for the production of an amorphous metal foil using a rapid solidification technology is provided. An amorphous metal foil having a width of 2 mm to 300 mm, a thickness of less than 20 µm and a maximum of 50 holes per square metre is also provided.

22 Claims, 6 Drawing Sheets

(56) References Cited

FOREIGN PATENT DOCUMENTS

| | | |
|---|---|---|
| DE | 4241342 A1 | 6/1993 |
| JP | S5647248 A | 4/1981 |
| JP | S57156863 A | 9/1982 |
| JP | H03133552 A | 6/1991 |
| JP | 2017030033 A | 2/2017 |

\* cited by examiner

AMORPHOUS METAL FOIL AND METHOD FOR PRODUCING AN AMORPHOUS METAL FOIL USING A RAPID SOLIDIFICATION TECHNOLOGY

This U.S. patent application claims the benefit of DE Patent Application No. 10 2019 122 524.8, filed on Aug. 21, 2019, the entire contents of which is incorporated herein by reference for all purposes.

BACKGROUND

The invention relates to an amorphous metal foil and a method for producing an amorphous metal foil using a rapid solidification technology.

From an economic point of view, it is desirable to be able to produce thin, rapidly solidified metal foils in long continuous strip lengths without the foil breaking off during the production process and without an adverse change in the quality of the foil over the course of the casting process. Owing to the special thermo-mechanical load on the casting wheel during foil production, the casting track gradually starts to break up before more than a few kilometres of foil have been formed on it. This results in non-homogenous strip quality with a deterioration in roughness and thus to a reduction in the lamination or fill factor of the foil.

In order to produce the longest possible continuous foil lengths of constant quality it is therefore known to work the surface of the casting track as the foil is produced in order to maintain the quality of the surface for as long as possible.

This can be achieved by means of material-removing processes such as polishing the casting roller, as disclosed in EP 3 089 175 B1, or grinding the roller or by means of brushes as disclosed in U.S. Pat. No. 6,749,700 B2. U.S. Pat. No. 9,700,937 B1 discloses an alternative reshaping process in which the casting-wheel track is rolled continuously in order to smooth it. Further improvements are nevertheless desirable.

SUMMARY

An object is therefore to produce an amorphous metal foil of constant material quality reliably in long lengths.

The invention is based on the new finding that current casting-track working methods leave residues on the casting-wheel that can lead to wetting problems in the molten mass and defects in the strip. When using material-removing processes, processing residues such as dust, brush hairs and polishing residues can penetrate the molten metal droplets, where they can cause imperfections. In thicker foils with a thickness greater than 20 µm such wetting problems may manifest themselves in the form of air bubbles on the casting-wheel side of the amorphous strip. In thin strips with a thickness of less than 20 µm, in particular, however, these wetting defects can result in undesirably large holes in the strip, which may be the starting point for breaks in the strip.

Even if the casting-wheel surface is worked using reshaping methods, as described in U.S. Pat. No. 9,700,937, it is impossible to exclude the possibility of lubricant from the rotating and bearing points reaching the wheel surface, where it can disrupt the wetting process and so cause the formation of holes in the foil. As a result, there are no hole-free thin foils available on the market.

According to the invention, therefore, an amorphous metal foil with a width of 2 mm to 300 mm, a thickness of less than 20 µm and a maximum of 50 holes per square metre is provided.

The foil thus has a thickness of less than 20 µm and a maximum of 50 holes per square metre. The quality of the foil is therefore increased and the risk of strip breaking due to holes is reduced. In addition, the properties of the foil are improved as they are not adversely affected by holes.

The term "hole" is used here to refer to a hole in the foil with a minimum area of 0.1 $mm^2$.

The term "amorphous" is used here to refer to an amorphous crystal structure of the alloy of the foil and to an amorphous percentage of the metal foil of at least 80 vol. %.

The metal foil according to the invention is produced using a rapid solidification technology. Due to the reduction in the number of holes in the amorphous metal foil it is possible to produce an amorphous metal foil with a greater continuous foil length in one casting process and on one casting track of the heat sink. This increases the profitability of amorphous metal foil production in industrial-scale plants. In addition, the reduced number of holes reduces, in particular, the frequency of breaks in downstream processing and so increases profitability in a desirable manner.

Amorphous metal foils have an inherent ductility. This mechanical property of the amorphous metal foil is put to use in certain applications. In such applications a metal foil with few, preferably no holes is advantageous since a hole in the foil represents a preferred break point that can lead to the foil breaking off. The reduction of the number of holes per square metre therefore improves the mechanical reliability of the foil when in use.

In some applications the amorphous metal foil is processed further, e.g. wound onto a reel. In these applications, too, a metal foil with few, preferably no holes and reliable mechanical properties is advantageous since the risk of tears during further handling is reduced.

In some applications the composition chosen for the metal foil has certain magnetic, in particular soft magnetic properties. For example, the metal foil may be an iron-based metal foil. A metal foil with few, preferably no holes is also advantageous here since, in addition to the more reliable mechanical properties, the lower number of holes means that the few holes present are unable to adversely affect the magnetic properties of the foil in a significant manner. This is important in magnetic shielding applications, for example.

In some applications the amorphous metal foil is heat treated, in order to provide a nanocrystalline metal foil, for example. These nanocrystalline metal foils can also be soft magnetic. Such heat treatment can be carried out continuously so that a small number of holes is advantageous to reduce the risk of strip tears.

In some applications a coil of the amorphous metal foil is heat treated when stationary and thus converted to a nanocrystalline state in a known manner. The now nanocrystalline metal foil is then wound off and laminated with an adhesive strip. For this process it is particularly important to have a metal foil with the smallest possible number of an holes in order to avoid strip tears and so productivity losses during the laminating process.

In further embodiments the amorphous metal foil has a width of 20 mm to 200 mm and/or a thickness of between 10 µm and 18 µm and/or fewer than 25 holes per square metre, preferably fewer than 10 holes per square metre. In this way it is possible to provide a wide, thin foil with that has only a small number of holes per square metre and can also be completely free of holes.

If there are one or more holes present in the foil, they can have a diameter of up to 5 mm, preferably less than 3 mm, and a minimum area of 0.1 $mm^2$.

In an embodiment the foil has a total area of at least 10 square metres (m²) and on average fewer than 50 holes, preferably fewer than 25 holes, per square metre (m²).

In an embodiment the aforementioned thickness data refer to the average thickness over a continuous length of 2 km, i.e. the amorphous metal foil has a width of 2 mm to 300 mm, an average thickness over a continuous length of 2 km of less than 20 μm and a maximum of 50 holes per square metre.

In an embodiment the aforementioned thickness data refer to the average thickness over the width of the foil, i.e. the amorphous metal foil has a width of 2 mm to 300 mm, an average thickness over the width of the foil of less than 20 μm and a maximum of 50 holes per square metre.

The foil has a wheel side that has been formed by solidification on the outer surface of a casting wheel (which acts as a heat sink) and an opposing, air side. In an embodiment the wheel side of the foil has a surface roughness with an arithmetic mean (Ra) of less than 0.8 μm, preferably less than 0.7 μm.

In addition, the surface roughness of the wheel side of the metal foil may deviate from the surface roughness by less than +/−0.2 μm over a length of at least 2 km and/or over an area of at least 100 m². For example, the wheel side of the metal foil may deviate by less than +/−0.2 μm over a length of at least 2 km at a foil width of 50 mm.

In an embodiment the amorphous metal foil has a continuous length of at least 2 km, preferably at least 10 km.

The amorphous metal foil may have various compositions. In order to produce a metal or an alloy as an amorphous foil using a rapid solidification technology, the metal foil contains one or more glass-forming elements such as Si, B and P. These glass-forming elements are also referred to as metalloids. The glass-forming element content may be between 10 at. % and 30 at. %.

In an embodiment the amorphous metal foil is an iron-based metal foil with a metalloid content of 10 at. % to 30 at. %.

In an embodiment the amorphous iron-based foil comprises $(Fe,T)_a M_b$ and up to 1 at. % impurities, where 70 at. %≤a≤90 at. % and 10 at. %≤b≤30 at. %, T being one or more of the elements Co, Ni, Mn, Cu, Nb, Mo, Cr, Zn, Sn and Zr and M being one or more of the elements B, Si, C and P.

In an embodiment, the amorphous iron-based foil comprises $Fe_a Cu_b M_c M'_d M''_e Si_f B_g$ and up to 1 at. % impurities, M being one or more of the elements from the group of IVa, Va, VIa elements or the transition metals, M' being one or more of the elements Mn, Al, Ge and the platinum elements, and M" being Co and/or Ni, where $a+b+c+d+e+f+g+\text{impurities}=100$ at. % and where $0.01 \leq b \leq 8$, $0.01 \leq c \leq 10$, $0 \leq d \leq 10$, $0 \leq e \leq 20$, $10 \leq f \leq 25$, $3 \leq g \leq 12$ and $17 \leq f+g \leq 30$.

In an embodiment the metal foil consists of 0.5 at. % to 1.5 at. % Cu, 2.5 at. % to 3.5 at. % Nb, 14.5 at. % to 16 at. % Si, 6 at. % to 7.5 at. % B and the rest iron and incidental impurities.

In alternative embodiments the amorphous metal foil is a Ni-, Co- or Cu-based foil with a metalloid content of 10 at. % to 30 at. %.

In an embodiment the amorphous metal foil has a composition of TM rest—M 10 at. % to 30 at. %, TM denoting the transition elements and M being substantially glass-forming elements from the main groups 3, 4 and 5, such as Si, B, P and C.

A total of up to 1 at. % incidental impurities may be present, preferably up to 0.5 at. %, preferably up to 0.2 at. %. In addition to other incidental impurities, up to 0.1 wt. % aluminium, up to 0.05 wt. % sulphur, up to 0.1 wt. % nitrogen and/or up to 0.1 wt. % oxygen may be present.

A method for the production of an amorphous metal foil using a rapid solidification technology is also provided. The method comprises the following:

providing a molten mass of an alloy, pouring the molten mass onto a moving outer surface of a moving heat sink, the molten mass solidifying on the outer surface and an amorphous metal foil being formed, as the molten mass is poured onto the moving outer surface of the heat sink, continuously pressing a rolling device against the outer surface of the heat sink at a pressure sufficient to smooth the outer surface of the heat sink, and producing the amorphous metal foil, the amorphous metal foil having a width of 2 mm to 300 mm, a thickness of less than 20 μm and a maximum of 50 holes per square metre.

In this method the surface of the heat sink is smoothed continuously during casting. The outer surface comes into contact with the rolling device as the heat sink moves. The rolling device is used to constantly re-prepare the outer surface, i.e. to re-smooth the outer surface, before the molten mass solidifies on it. The outer surface can be rolled with the rolling device and so reshaped, thereby smoothing the outer surface.

In this context, the term "reshaping" is used to refer to the redistribution of material. The purpose of using the rolling device is not to remove material from the outer surface as might be done using a brush. As a result no swarf and almost no abrasion and/or dust, which might adversely affect the production process, are created.

The pressure sufficient to reshape the outer surface depends on the material strength and the state of the heat sink or the outer surface of the heat sink. Less pressure is used with a soft material such as copper than with a hard material such as steel, for example.

In particular, the rolling device is pressed against a point on the outer surface of the moving heat sink located between the point at which the strip detaches from the heat sink and the casting surface, i.e. the point on the heat sink at which the molten mass hits the heat sink. Consequently, the outer surface can be reshaped by the rolling device after the strip has solidified on the outer surface and before the next contact with the molten mass.

Consequently, the roughness of the outer surface after contact with the rolling device or reshaping by the rolling device is lower than before contact with the rolling device. This has the advantage that the roughness of the strip and, in particular, the roughness of the surface of the strip produced by solidification on the outer surface of the moving heat sink, can be kept low. The homogeneity of the strip can thus be achieved over longer lengths.

This in turn makes a longer casting process possible and reduces manufacturing costs. In addition, lower roughness can improve various properties of the strip produced. For example, the surface roughness of some magnetic alloys influences their magnetic properties. By producing a long strip with low, homogenous surface roughness it is possible in one casting process to produce a plurality of magnetic cores that also have more homogenous properties. This can reduce production costs due to fewer losses.

In an embodiment the rolling device is pressed against the outer surface of the heat sink in such a manner as to continuously reduce the roughness of the outer surface of the heat sink as the molten mass is poured onto the outer surface of the heat sink.

In this method the area on which the molten mass solidifies is reshaped and smoothed before the molten mass hits it again. This results in a more homogenous outer surface and consequently in the production of rapidly solidified strips with lower surface roughness and a lower surface crystallisation content.

In an embodiment as the molten mass is poured onto the moving outer surface of the heat sink, the rolling device is pressed continuously against the outer surface of the heat sink with a pressure sufficient to smooth the outer surface of the heat sink without leaving any processing residues on the casting track of the heat sink.

The rolling device may, for example, be encased so that residues are unable to reach the surface of the casting track.

In an embodiment a rotatable roller is provided as the rolling device and the surface of the rotating roller is pressed against the outer surface of the rotating heat sink with a pressure that is sufficient to reshape the surface of the heat sink that is in contact with the rolling device.

The heat sink, which may also be called as a casting wheel, casting roller or cooling body, may take the form of a wheel or a roller, the molten mass being applied to the circumferential surface of the wheel or roller. The axis of rotation is therefore perpendicular to the centre of the circular end of the wheel.

In an embodiment a rotatable roller is provided as the rolling device and the roller is driven in a first direction of rotation and the heat sink is driven in a second direction of rotation, the first direction of rotation being opposite to the second direction of rotation.

In an embodiment the roller is moved over the outer surface of the heat sink parallel to the second axis of rotation of the heat sink such that contact with the outer surface of the heat sink is spiral-shaped.

The rolling device may also have more than one roller. In an embodiment the two or more rollers are arranged such that at least two rollers can be used simultaneously on one casting track.

In this embodiment the rolling device may be brought into contact with various regions of the width of the heat sink, e.g. with only one part of the circumferential surface of the wheel. This can be advantageous if there is a plurality of casting tracks on one heat sink. The casting tracks can thus be reshaped by the rolling device one after another such that a plurality of castings can be carried out with the same heat sink but with different casting tracks without replacing the heat sink. This can reduce production times and thus production costs.

The rolling device may also be movable perpendicularly in relation to the outer surface of the movable heat sink. When the outer surface moves in the z direction, the rolling device can then be moved in the x direction and/or in the y direction. A movement in the x direction can, for example, make it possible to reshape different strip-shaped regions of the outer surface. A movement in the y direction can be used to adjust the pressure with which the rolling device is pressed against the outer surface.

In an embodiment as the molten mass is poured onto a casting track on the moving outer surface of the moving heat sink the casting track is protected from contamination by organic material. The term "casting track" refers to the region of the heat sink in which the metal foil is produced.

It is, for example, possible to prevent lubricant residues from reaching the outer surface of the heat sink by positioning the rotatable bearing parts of the rolling device outside the casting track region of the casting wheel or by encasing the rolling device and/or using an appropriate lubricant, e.g. a less fluid lubricant, or using a bearing that does not require lubrication, e.g. a magnetic bearing or a compressed air bearing.

In an embodiment the rolling device has a casing to prevent lubricant from reaching the casting wheel.

In an embodiment the rolling device has bearings that are spatially separated from the heat sink and the casting wheel or are arranged spatially separated from the heat sink. For example, the bearings are arranged to the side of the casting wheel to prevent lubricant or other contaminants from reaching the casting wheel.

In a further embodiment the bearings are separated from the casting wheel by a distance by use of a rigid axle such that once again no lubricant is able to reach the casting wheel.

In an embodiment the rolling device has bearings and the heat sink has at least one casting track onto which the molten mass is poured. The bearings are spatially separated from the casting track. For example, the bearings are arranged to the side of the casting track to prevent lubricant or other contaminants from reaching the casting wheel.

In an embodiment the rolling device has a lubricant-free bearing. In an embodiment the rolling device has a plurality of rollers that are arranged such that at least two rollers can be pressed simultaneously against the same casting track of the heat sink.

In an embodiment the solidified foil is continuously received on a reel.

In an embodiment the heat sink is made of a material with a thermal conductivity of greater than 200 W/mK and a Vickers hardness of less than 250 HV. This combination of material parameters promotes the reduction of the surface crystallisation content since the higher thermal conductivity helps increase the cooling rate and the hardness results in slower deterioration of the surface quality of the heat sink.

In an embodiment the molten mass has a melting point of greater than 950° C.

In an embodiment the molten mass has a composition comprising an iron-based alloy and a metalloid content of 10 at. %≤b≤30 at. %, it being possible to use one or more of the elements B, Si, C and P as the metalloids.

In an embodiment the foil comprises $(Fe,T)_a M_b$ and up to 1 at. % impurities, where 70 at. %≤a≤90 at. % and 10 at. %≤b≤30 at. %, T being one or more of the elements Co, Ni, Mn, Cu, Nb, Mo, Cr, Zn, Sn and Zr and M being one or more of the elements B, Si, C and P.

In an embodiment the foil comprises $Fe_a Cu_b M_c M'_d M''_e Si_f B_g$ and up to 1 at. % impurities, M being one or more of the elements from the group of IVa, Va, VIa elements or the transition metals, M' being one or more of the elements Mn, Al, Ge and the platinum elements, and M" being Co and/or Ni, where $a+b+c+d+e+f+g+\text{impurities}=100$ at. % and $0.01 \leq b \leq 8$, $0.01 \leq c \leq 10$, $0 \leq d \leq 10$, $0 \leq e \leq 20$, $10 \leq f \leq 25$, $3 \leq g \leq 12$ and $17 \leq f+g \leq 30$.

A total of up to 1 at. % incidental impurities may be present, preferably up to 0.5 at. %, preferably up to 0.2 at. %. In addition to other incidental impurities, up to 0.1 wt. % aluminium, up to 0.05 wt. % sulphur, up to 0.1 wt. % nitrogen and/or up to 0.1 wt. % oxygen may be present.

A method for the production of a nanocrystalline foil is also provided. An amorphous foil produced using a method according to one of the embodiments described here is heat treated at a temperature Ta, where 450° C.≤Ta≤750° C., in order to generate a nanocrystalline structure in the foil in which at least 80 vol. % of the grains have an average size of less than 100 nm.

In an embodiment the amorphous metal foil is continuously heat treated under tensile stress at a temperature Ta, where 450° C.≤Ta≤750° C., in order to generate a nanocrystalline structure in the foil in which at least 80 vol. % of the grains have an average size of less than 100 nm.

In an embodiment the foil is heat treated in a continuous furnace in which the foil can be placed under tensile stress.

In an embodiment the foil is drawn through the continuous furnace at a speed s such that the dwell time of the foil in a temperature zone of the continuous furnace with a temperature Ta is between two seconds and 10 minutes.

In an embodiment the foil is continuously heat treated under a tensile stress of 1 MPa to 1000 MPa.

In an embodiment one or more magnetic properties of the foil are continuously measured and the tensile stress adjusted.

In an embodiment the amorphous metal foil is wound to form a coil and heat treated as a coil in order to generate a nanocrystalline structure in the metal foil. The coil is then unwound and worked further in order to produce the desired final form of the nanocrystalline foil. For example, the nanocrystalline foil can be worked further by means of sticking, lamination, stacking, punching and/or cutting.

BRIEF DESCRIPTION OF THE DRAWINGS

Various embodiments are explained in greater detail below with reference to the drawings and examples.

DETAILED DESCRIPTION OF EXAMPLE EMBODIMENTS

Figure 1A:
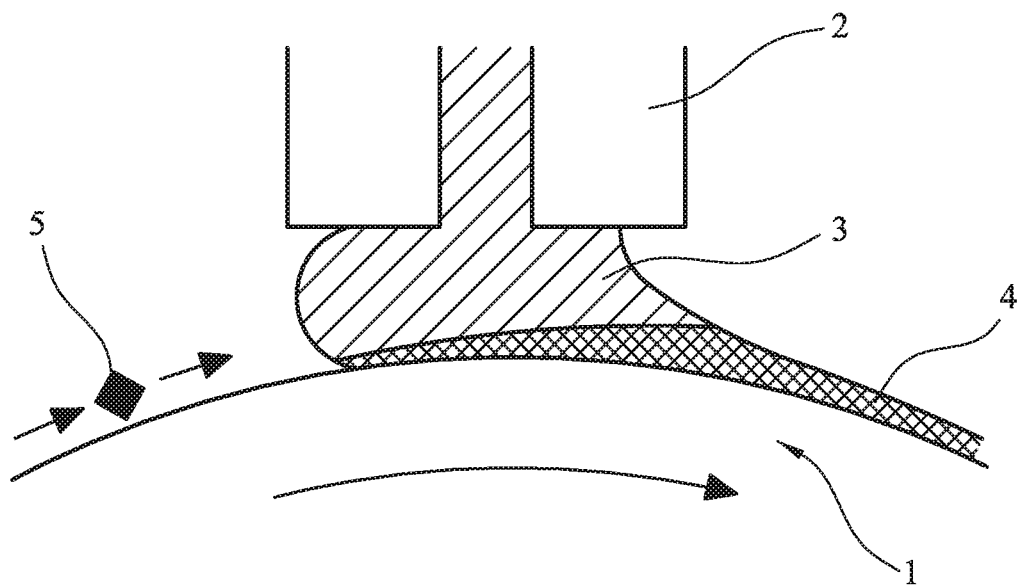
FIGS. 1a-1d show a molten droplet, rotating casting roller, ceramic casting nozzle, metal droplet, metal strip, solid particle, and air inclusion during the formation of a hole in a thin amorphous foil due to a local wetting defect.

When producing amorphous foils using rapid solidification technology (melt-spinning), a glass-forming metal alloy is melted in a crucible that is typically made substantially of oxide ceramic (e.g. aluminium oxide) and/or graphite. Depending on the reactivity of the molten mass, the melting process may take place in air, in a vacuum or in an inert gas such as argon or nitrogen, for example. Once the alloy has been melted down at temperatures well above the liquidus point, the molten mass is transported to a casting tundish and injected through a casting nozzle, which generally has a slit-shaped outlet opening, onto a rotating wheel or roller made of a copper alloy. To this end, the casting nozzle is brought very close to the surface of the rotating copper wheel at a distance of approx. 50 μm to 500 μm from it. The molten mass passes through the nozzle outlet and hits the moving copper surface where it solidifies at cooling rates of approx. $10^{4°}$ K/min to $10^{6°}$ K/min. Due to the rotational movement of the roller, the solidified molten mass is carried away as a continuous foil strip, detached from the cooling roller and the wound onto a winding device as a continuous foil strip.

The maximum possible length of the foil strip is, in principle, limited by the holding capacity of the crucible, which can range from a few kilogrammes to several tonnes depending on the size of the plant. When operating with a plurality of crucibles in parallel it is even possible to achieve an almost continuous supply of molten mass to the casting tundish. The scale of plant in which commercially available amorphous foils are manufactured typically has crucible sizes of more than 100 kg. In the alloy consisting of 82.8 wt. % Fe, 1.3 wt. % Cu, 5.6 wt. % Nb, 8.8 wt. % Si, 1.5 wt. % B, which is commercially available from Vacuumschmelze GmbH & Co. KG, Hanau, Germany under the trade name VITROPERM 500, for example, and with a foil width of approx. 100 mm and a foil thickness of 0.018 mm, this results in a strip length of approx. 8 km.

In some applications of these metal foils, the amorphous foil as produced is wound to form a core, which is then converted to a nanocrystalline state by means of appropriate heat treatment. In the nanocrystalline state this metal foil is completely brittle with a high degree of sensitivity to breaking. This complicates the handling of the foil.

Some applications of these foils require the use of very thin foil thicknesses of approx. 10 to 20 μm with foil widths of 20 to 200 mm and low surface unevenness and roughness that are very largely free of structural defects such as pimples and holes. In these applications the strip is first heat treated and then brought into the desired final form. The desired final form may be wound foil cores or flat shields in which a plurality of foil layers are laminated with adhesive layers to form a composite material.

Common to all these applications is the fact that the foils, which are amorphous in the cast state, are first converted to a nanocrystalline state by means of heat treatment, then subjected to tensile stress during further working, when they must also be able to tolerate low shear forces. Holes in the foil restrict its cross section and promote foil tears during final working, leading in turn to reduced productivity in the manufacturing process.

It has been established that large holes with a lateral extent in at least one direction of more than 3 mm in the foil can result in tears that significantly reduce the productivity of the laminating process. In laminated applications, the foils should occupy a small space. This means that surface roughness and unevenness need to be as low as possible to achieve a high lamination factor.

Various approaches are used to avoid holes and air bubbles in the foil.

Wear on the casting-wheel surface during the casting process leads to increased surface roughness of the casting wheel and, in turn, to the formation of cavities or structures that transport process gas into the molten metal droplets and cause larger gas bubbles in the contact region between the molten metal droplets and the casting wheel. When the molten metal solidifies, these gas bubbles are frozen into the amorphous strip and result in hole-like defects, particularly in thin foils. This increased roughness also results in unevenness in the strip and in a lower lamination factor.

In order to minimise wear on the casting wheel it is desirable to select a high-strength casting-wheel material. In the copper materials produced using melting techniques generally used, the properties of strength and thermal conductivity tend to act in opposite directions. A copper material with the maximum possible thermal conductivity will always have a lower strength than more highly alloyed copper materials. This is due to the physics of alloys produced using melting techniques. Higher alloyed copper materials are generally stronger but have lower conductivity. In order to produce Fe—Cu—Nb—Si—B foils such as the alloy with the trade name VITROPERM 500 produced by Vacuumschmelze GmbH & Co. KG, Hanau, Germany, in particular, it is however necessary to use casting-wheel materials with relatively high conductivities in order to achieve sufficiently high cooling rates during foil production. If the cooling rates are not sufficiently high, the foils become brittle—or partly brittle—and so cannot be wound continuously in the casting process, or tear off during winding, resulting in undesirably lower productivity in foil production. It is desirable to use casting-wheel materials with a thermal conductivity greater than 200 W/mK. However, such materials have a hardness of less than 250 HV (HV30).

In an embodiment, therefore, a casting wheel (acting as a heat sink) made of a material with a thermal conductivity of greater than 200 W/mK and a Vickers hardness of less than 250 HV is selected. One example of a suitable material is a copper-beryllium alloy with less than 2% beryllium.

If these soft and highly conductive materials are to be used in the casting of amorphous foils in the long term, it is necessary to ensure that the contact surface between the molten mass/strip and the casting wheel is worked evenly even during foil production and to keep the roughness of the wheel surface at a constant and uniformly low level.

Here a non-abrasive, reshaping method based on the rolling of the casting wheel described in U.S. Pat. No. 9,700,937 B1 is used. In addition, however, the casting roller is protected against abrasive residues so that even the smallest particles are unable to reach the wheel surface, where they might lead to wetting defects and so to the formation of holes in the foil.

The description below refers to FIG. 1 and explains how local wetting defects can lead to holes in thin amorphous foils. FIG. 1a shows a rotating casting roller 1 and a ceramic casting nozzle 2 that is positioned approx. 50 to 500 µm from the casting roller. Molten metal at a temperature of approx. 1300° C. flows through this casting nozzle and forms a molten metal droplet 3 between the nozzle and the casting wheel 1 that solidifies on the casting-wheel surface and from which molten mass permanently solidified by the rotational movement of the casting wheel 1 is carried away in the form of a thin metal strip 4.

Figure 1B:
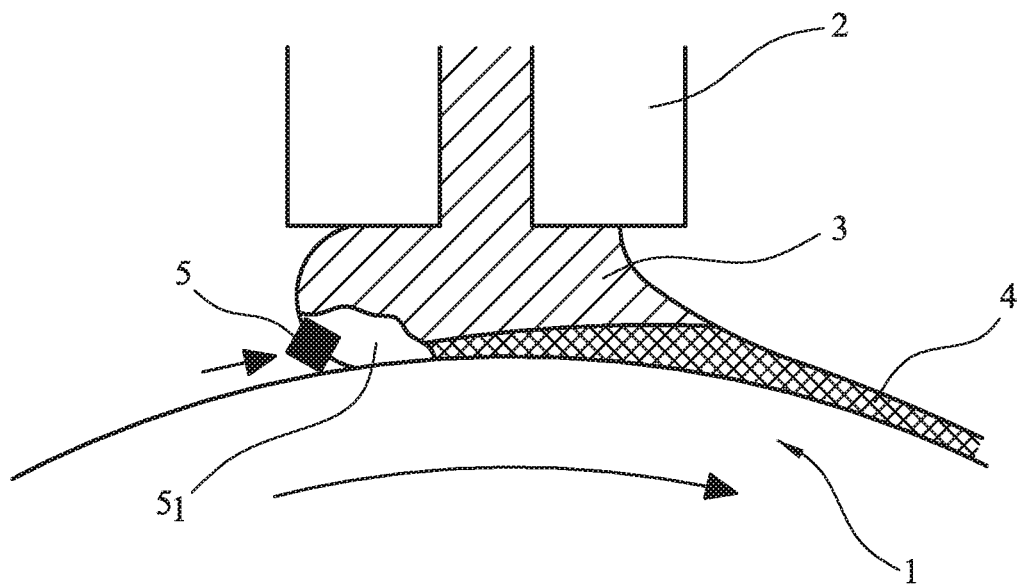
Figure 1C:
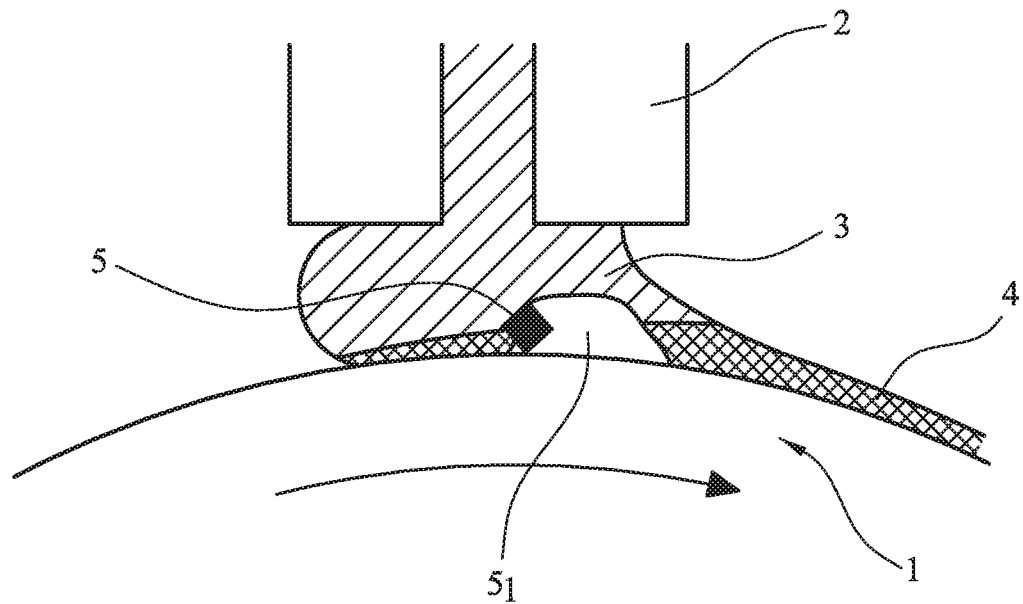
Figure 1D:
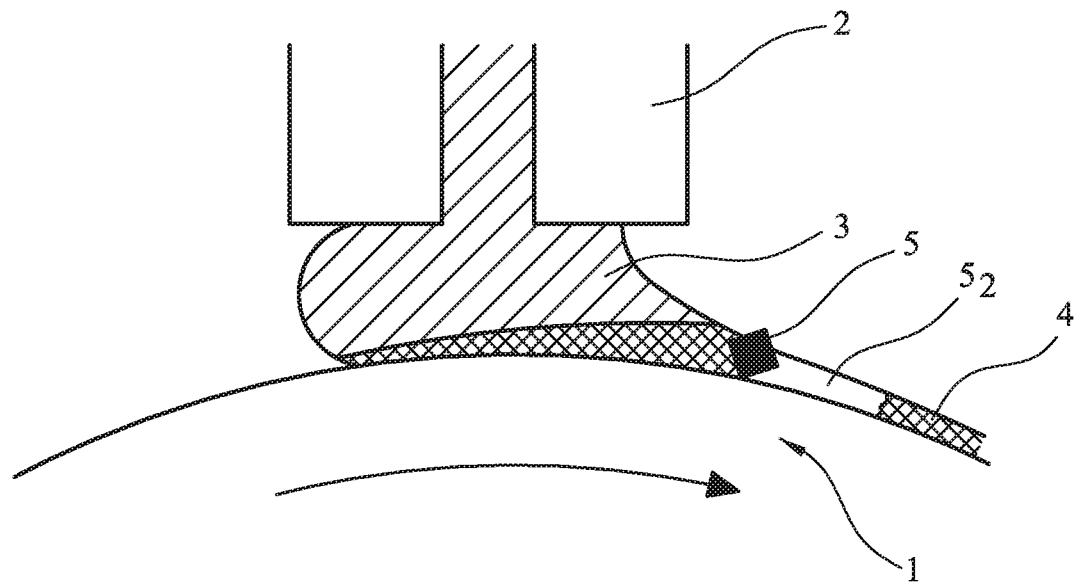

A solid particle 5 formed during continuous casting-wheel working, which may, for example, be an abrasive grain, a metal particle from the casting wheel or a piece of brush hair, is transported in the air layer on the casting wheel towards the molten metal droplet 3 and then strikes and enters the molten metal droplet 3 at high speed, as illustrated in FIG. 1b, where it results in a small air inclusion 51 due to the short wetting defect. The air inclusion 51 and, in certain circumstances, the particle 5 as well pass underneath the molten metal droplet 3, as illustrated in FIG. 1c, initially forming a bubble/cavity in the solidifying molten metal before manifesting itself as a hole 52 in the solidified amorphous metal strip on exiting the molten metal droplet.

Figure 3:
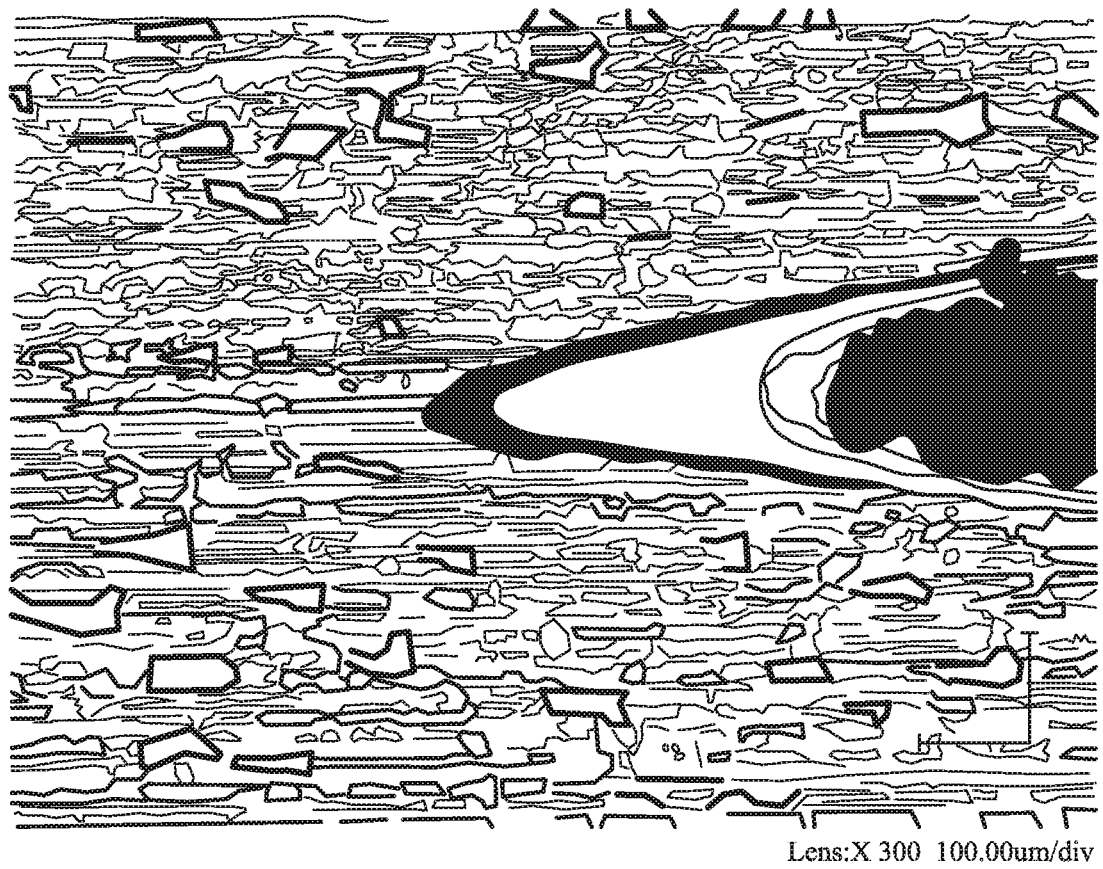
FIG. 3 shows a photograph of a grain of copper at the start of a wetting defect in a comparison strip.
Figure 4:
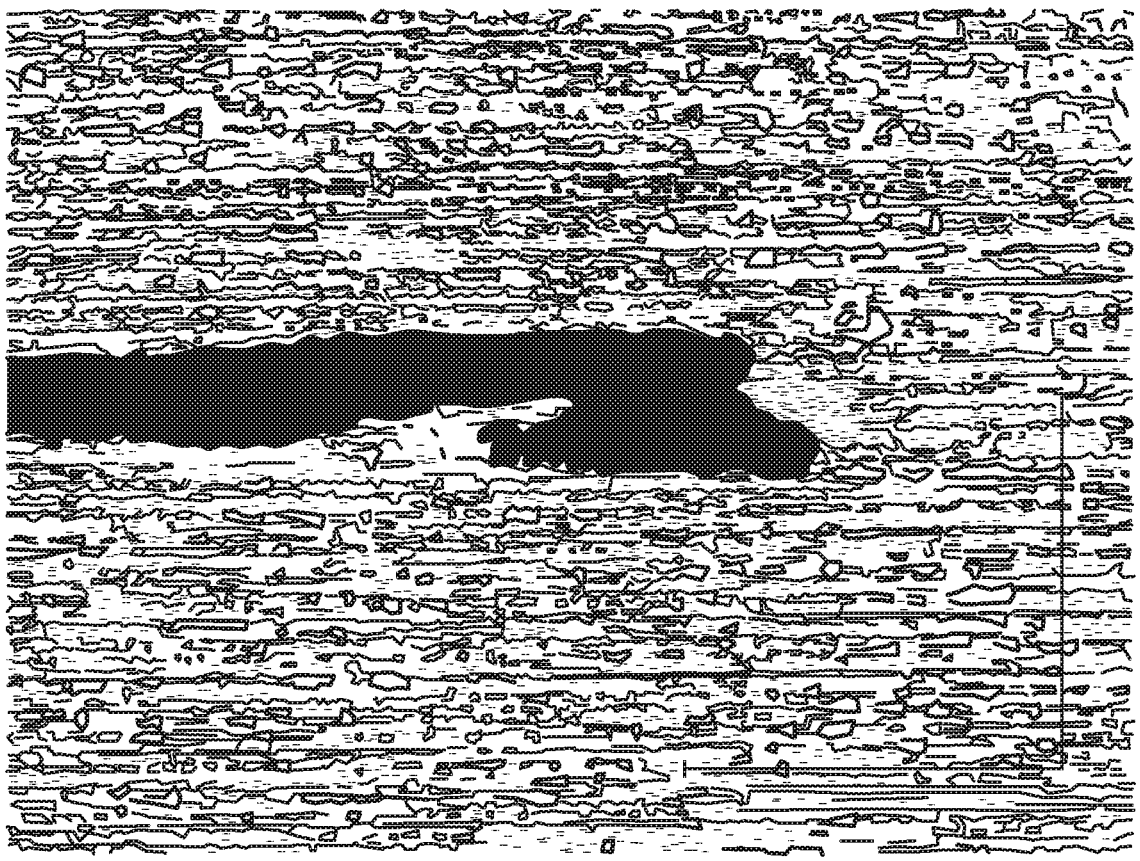
FIG. 4 shows a photograph showing residues of molten copper at the end of a wetting defect.

One example of such particle residues can be seen in the photograph of a comparison strip in FIG. 3. It shows how a copper particle formed during continuous casting-wheel working is the starting point for a wetting defect that grows into a hole in the strip. FIG. 4 shows the end of a wetting defect, but residues of molten copper can even be identified on the underside of the strip. One explanation of this observation that the copper is no longer present in particle form is that particles from continuous casting-wheel working have penetrated the molten metal droplet and caused a cavity in the molten metal droplet. The particles melt in this cavity due to the high temperature of the molten metal above them and so adhere to the underside of the strip of metal foil as a thin film.

Figure 2A:
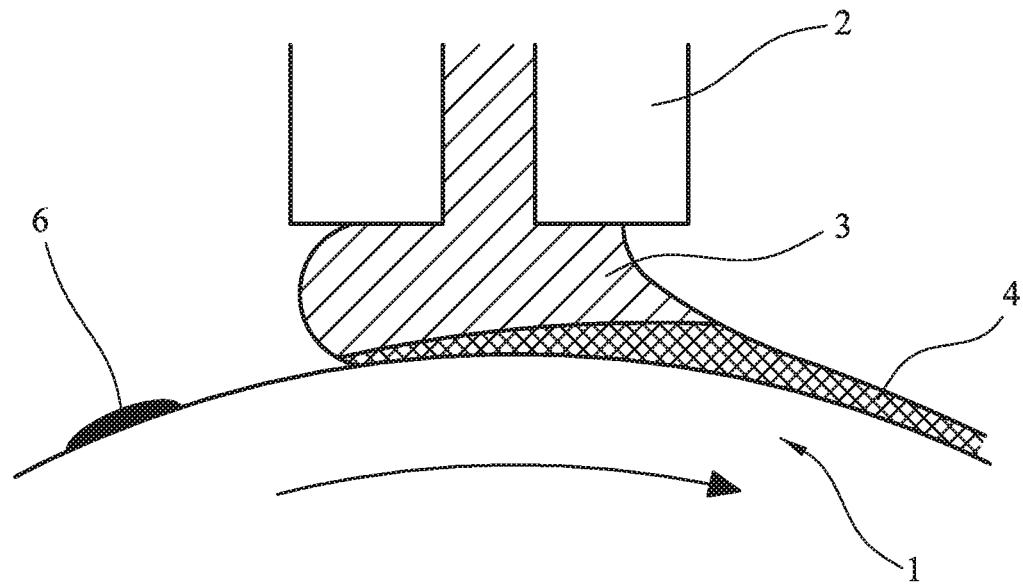
FIGS. 2a-2c show the molten droplet, rotating casting roller, ceramic casting nozzle, metal droplet, and metal strip during the formation of a hole in a thin amorphous foil due to a local wetting defect.
Figure 2B:
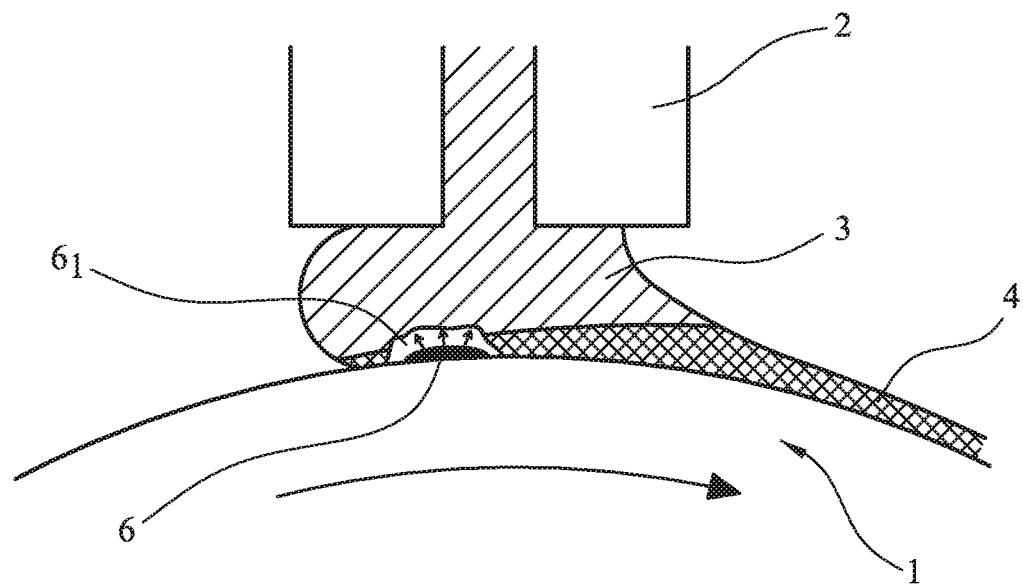
Figure 2C:
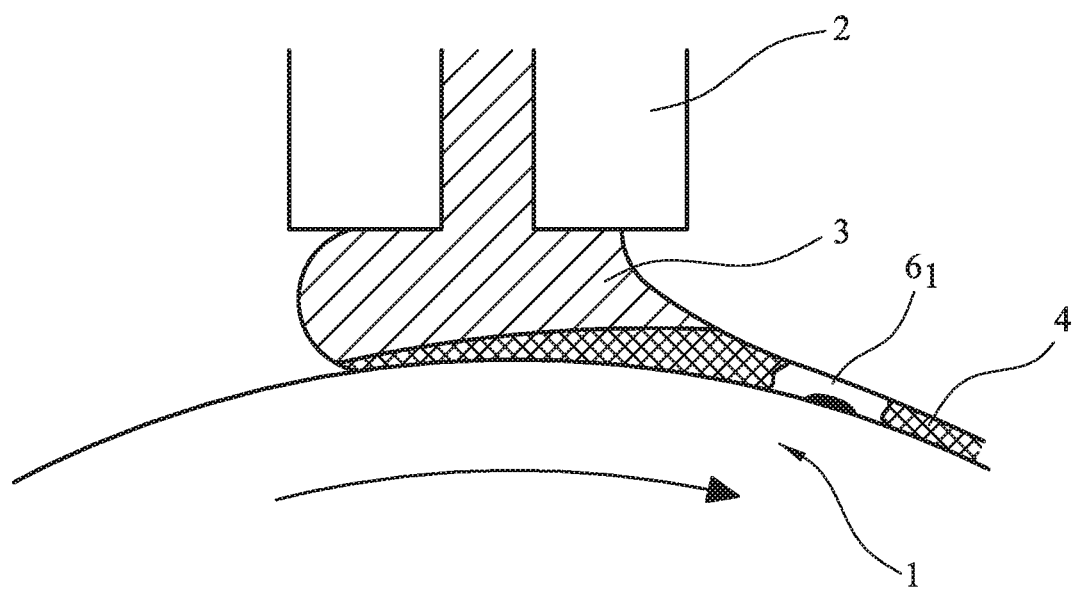

Referring to FIG. 2, it is explained how a liquid or solid particle of organic dirt or a deposit such as water, oil or grease, for example, located on the casting-wheel surface 6 can result in a wetting defect. This liquid or solid organic material has an evaporation temperature below the melting temperature of the molten metal mass 3 (see FIG. 2a). If this dirt enters the droplet of molten metal 3, as illustrated in FIG. 2b, it will evaporate immediately due to the high melting temperature 3 and result in a gas bubble under the molten metal droplet 3 that subsequently manifests itself as a hole in the solidified amorphous metal strip 4 when it exits the molten metal droplet, as illustrated in FIG. 2c.

The figures show that these small wetting defects can manifest themselves as holes, particularly in very thin strips of typically less than 25 µm. In metal strips with higher foil thicknesses the structure of these cavities can be retained, forming "air bubbles" on the casting-wheel side of the final metal strip.

Figure 5:
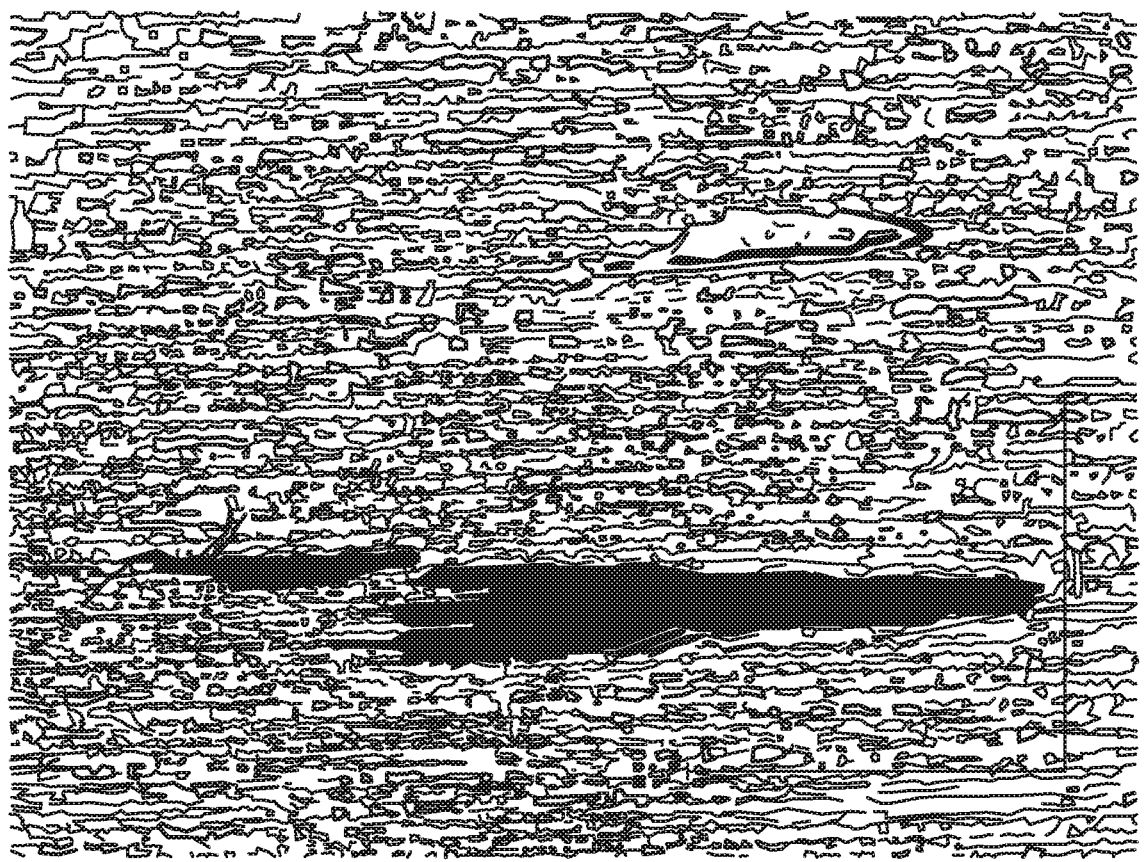
FIG. 5 shows a photograph of a comparison strip with wetting defects of different sizes.

FIG. 5 shows that smaller wetting defects do not result in cavities/bubbles deep enough to break through the foil thickness and create a hole. For this reason, the thicker the foil thickness, the less probable the occurrence of holes.

Holes and surface roughness are important factors in the further working of heat treated strips under tensile stress as far as the magnetic properties of the foil are concerned. The holes weaken the cross section of the foils and if located in the edge region form a starting point for notch effects and tears in the foils, which in turn leads to a undesired, significant reduction in productivity during further processing.

For this reason it is currently practically impossible to buy amorphous metal foils with a foil thickness of less than 20

µm that is largely free of hole-like defects over long lengths commercially. Thin foils with a foil thickness of less than 20 µm have more holes the thinner they are made. For example, strips with foil thicknesses and foil width of 16 µm×60 mm have a plurality of holes measuring up to 4 mm.

Table 1 shows an evaluation of hole distribution in samples of the commercially available materials. It shows that a typical number of holes in the foil is between 141 and 443 holes per square metre of foil.

TABLE 1

| Sample | Dimensions | Foil roughness Ra Wheel side (µm) | Ra Air side (µm) | Number of holes by hole size (quantity/m²) | | | | | Total per m² |
|---|---|---|---|---|---|---|---|---|---|
| | | | | 0-1 mm | 1-2 mm | 2-3 mm | 3-4 mm | 4-5 mm | |
| #1 | 16 µm * 60 mm | 0.9 | 1.2 | 110 | 189 | 110 | — | — | 409 |
| #2 | 16 µm * 63 mm | 1.2 | 1.5 | 58 | 50 | 33 | — | — | 141 |
| #3 | 17 µm * 60 mm | 0.9 | 1.1 | 158 | 126 | 47 | 31 | — | 362 |
| #4 | 14 µm * 53 mm | 0.8 | 1.1 | 211 | 166 | 44 | 22 | — | 443 |

Example According to the Invention

An amorphous foil with a composition of 82.8 wt. % Fe, 1.3 wt. % Cu, 5.6 wt. % Nb, 8.8 wt. % Si and 1.5 wt. % B is produced on a casting wheel with a thermal conductivity of more than 200 W/mK. The surface of the casting track is worked during foil production by rolling. The roller used is designed such that it leaves no residues likely to cause wetting defects on the casting wheel. A foil with a thickness of less than 20 µm and fewer than 10 holes per square metre can be produced, as given in Table 2.

Table 2 provides a summary of the results of a comparison of various different casting-track working methods. It gives details of different online casting-track working methods for the alloy VITROPERM with a foil width of 66 mm and a foil thickness of 18 µm produced on a casting wheel made of a copper alloy. Material-removing processes using sandpaper and wire brushes result in foils with at least 100 holes per square metre and in an increased number of tears during casting. In contrast, the reshaping process of rolling causes few tears and few holes.

In the example according to the invention rolling was used as the working process and the casting wheel was protected from lubricant residues in order to reduce the number of holes per square metre to fewer than 10.

TABLE 2

| Polishing method | Tears during casting (Qty. per km) | Holes Holes (Qty. per m²) | Roughness Ra (Wheel side) |
|---|---|---|---|
| Sandpaper | ● | ■ | ≤0.7 |
| Wire brushes | ● | ▲ | ≥0.7 |
| Rolling | ♦ | ▲ | ≤0.7 |
| Rolling* | ♦ | ● | ≤0.7 |

■ = 100 to 1000
▲ = 10 to 100
● = 1 to 10
♦ = <1
*According to the invention

By using specially encapsulated rotating part lubricants on special roller tools, the rotating components are lubricated in such a manner as to ensure that no problematic lubricant residues reach the surface of the casting wheel. This makes it possible to produce thin foils that have an even lower number of hole defects and low roughness even with long casting-track lengths of more than 10 km.

The invention thus makes it possible to produce thin foils (<20 µm) in long lengths without residues from continuous casting-wheel working resulting in holes in the foil. Using this method it is possible to produce wide, thin foils in long lengths that have few hole-like strip defects and a lamination factor of over 73%. With foils produced in this manner it is possible to further work the foils in the nanocrystalline state at high productivity levels without the disruption of tears in the foil.

Methods that leave residues that prevent the wetting of the molten metal on the roller or result in residues on or in the metal foil and so have a negative impact on the performance characteristics of the foil are not therefore used. Such residues include all organic components such as oils and polishes. However, small solid bodies such as metal dust, abrasive grits and brush hairs caught in the molten metal droplets can also lead to local wetting problems, holes, inclusions and imperfections in the strip.

The invention thus provides an amorphous metal foil that has a lower number of holes and can be produced in a width of up to 300 mm and in longer continuous strip lengths, e.g. up to 8 km. The small number of holes improves the mechanical properties of the amorphous metal foil because the number of probable break points is reduced since fewer holes means less reduction in cross section and less notch effect and makes it easier to avoid strip tears in production, further working and use. The magnetic properties of soft magnetic metal foils are improved because they are no longer adversely affected by holes in the metal foil. The cost effectiveness of the production of these amorphous metal foils in industrial-scale plants is therefore increased.

The invention claimed is:

1. A method for the production of an amorphous metal foil using a rapid solidification technology comprising:
   providing a molten mass of an alloy,
   pouring the molten mass onto a moving outer surface of a moving heat sink, the molten mass solidifying on the outer surface and the amorphous metal foil being formed,
   as the molten mass is poured onto the moving outer surface of the heat sink, continuously pressing a rolling device against the outer surface of the heat sink with a rolling device contact pressure that is sufficient to smooth the outer surface of the heat sink, and
   producing the amorphous metal foil, the amorphous metal foil having a width of 2 mm to 300 mm, a thickness of less than 20 µm and fewer than 50 holes per square meter.

2. A method according to claim 1, wherein the rolling device is pressed against the outer surface of the heat sink such that it continuously reduces the roughness of the outer surface of the heat sink as the molten mass is poured onto the outer surface of the heat sink.

3. A method according to claim 1, wherein a rotatable roller is provided as the rolling device and the surface of the rotating roller is pressed against the outer surface of the rotating heat sink with a pressure such that the surface of the heat sink that is in contact with the rolling device is reshaped.

4. A method according to claim 3, wherein the roller is moved over the outer surface of the heat sink parallel to a first axis of rotation of the heat sink such that contact with the outer surface of the heat sink is spiral-shaped.

5. A method according to claim 1, wherein a rotatable roller is provided as the rolling device and the roller is driven in a first direction of rotation and the heat sink being driven in a second direction of rotation, the first direction of rotation being opposite the second direction of rotation.

6. A method according to claim 1, wherein, during the pouring of the molten mass onto a casting track of the moving outer surface of the moving heat sink, at least the casting track of the outer surface is protected from contamination by an organic material.

7. A method according to claim 1, wherein the rolling device has a lubricant-free bearing.

8. A method according to claim 1, wherein the rolling device has a casing.

9. A method according to claim 1, wherein the rolling device has bearings that are spatially separated from the moving heat sink.

10. A method according to claim 1, wherein the rolling device has bearings and the moving heat sink has at least one casting track, the bearings being spatially separated from the casting track.

11. A method according to claim 1, wherein the rolling device has a plurality of rollers that are arranged such that at least two rollers are pressed against a casting track of the heat sink simultaneously.

12. A method according to claim 1, wherein the solidified foil is continuously received on a reel.

13. A method according to claim 1, wherein the heat sink comprises a material having a thermal conductivity of greater than 200 W/mK and a Vickers hardness of less than 250 HV.

14. A method according to claim 1, wherein the amorphous metal foil is a nickel-based foil or a cobalt-based foil or a copper-based foil.

15. A method according to claim 1, wherein the metal foil is an iron-based foil.

16. A method according to claim 15, wherein the foil comprises $(Fe,T)_a M_b$ and up to 1 at. % impurities, where 70 at. %≤a≤85 at. % and 15 at. %≤b≤30 at. %, T is one or more of the elements Co, Ni, Mn, Cu, Nb, Mo, Cr, Zn, Sn and Zr and M is one or more of the elements B, Si, C and P.

17. A method according to claim 15, wherein the foil comprises $Fe_a Cu_b M_c M'_d M''_e Si_f B_g$ and up to 1 at. % impurities, M is one or more of the elements from the group of IVa, Va, VIa elements or the transition metals, M' is one or more of the elements Mn, Al, Ge and the platinum elements, and M" is Co and/or Ni, where a+b+c+d+e+f+g+impurities=100 at. % and $0.01 \leq b \leq 8$, $0.01 \leq c \leq 10$, $0 \leq d \leq 10$, $0 \leq e \leq 20$, $10 \leq f \leq 25$, $3 \leq g \leq 12$ and $17 \leq f+g \leq 30$.

18. A method for the production of a nanocrystalline foil, comprising: a heat treatment of an amorphous foil produced using the method according to claim 1 at a temperature Ta, where 450° C.≤Ta≤750° C., in order to generate a nanocrystalline structure in the foil in which at least 80 vol. % of the grains have an average size of less than 100 nm.

19. A method according to claim 18, wherein the foil is continuously heat treated under tensile stress.

20. A method according to claim 19, wherein the foil is drawn continuously through a continuous furnace at a speed s such that a dwell time of the foil in a temperature zone of the continuous furnace with a temperature Ta is between two seconds and 10 minutes.

21. A method according to claim 19, wherein the foil is continuously heat treated under a tensile stress of 1 MPa to 1000 MPa.

22. A method according to claim 18, wherein the amorphous metal foil is first wound into a coil and heat treated as a coil in order to generate a nanocrystalline structure in the metal foil, and the coil is then unwound and worked further in order to produce the final form of the nanocrystalline foil.

* * * * *